United States Patent
Ducksbury et al.

(10) Patent No.: US 7,512,277 B2
(45) Date of Patent: Mar. 31, 2009

(54) DATA COMPRESSION FOR COLOUR IMAGES USING WAVELET TRANSFORM

(75) Inventors: Paul Gerard Ducksbury, Malvern (GB); Margaret Jai Varga, Malvern (GB)

(73) Assignee: Qinetio Limited (GB)

( * ) Notice: Subject to any disclaimer, the term of this patent is extended or adjusted under 35 U.S.C. 154(b) by 518 days.

(21) Appl. No.: 10/510,649

(22) PCT Filed: Apr. 9, 2003

(86) PCT No.: PCT/GB03/01545

§ 371 (c)(1),
(2), (4) Date: Oct. 8, 2004

(87) PCT Pub. No.: WO03/090471

PCT Pub. Date: Oct. 30, 2003

(65) Prior Publication Data

US 2005/0169548 A1    Aug. 4, 2005

(30) Foreign Application Priority Data

Apr. 19, 2002  (GB) ................................ 0208972.0
Aug. 27, 2002  (GB) ................................ 0219816.6

(51) Int. Cl.
G06K 9/36     (2006.01)
G06K 9/46     (2006.01)
H04B 1/66     (2006.01)
H04N 7/12     (2006.01)

(52) U.S. Cl. ...................................... 382/232; 375/240
(58) Field of Classification Search ......... 382/232–253; 375/240–240.28
See application file for complete search history.

(56) References Cited

U.S. PATENT DOCUMENTS 5,067,015 A * 11/1991 Combridge et al. ..... 375/240.11
5,142,360 A *  8/1992 Niihara ................... 375/240.16

(Continued)

FOREIGN PATENT DOCUMENTS

EP      0 961 494      12/1999

(Continued)

OTHER PUBLICATIONS

M. Rabbani and R. Joshi, An overview of the JPEG 2000 still image compression standard, Signal Processing: Image Communication, vol. 17, Issue 1, Jan. 2002, pp. 3-48.*

(Continued)

Primary Examiner—Matthew C Bella
Assistant Examiner—Manav Seth
(74) Attorney, Agent, or Firm—McDonnell Boehnen Hulbert & Berghoff LLP

(57) ABSTRACT

The invention describes a wavelet compression method for color converted image planes (Y, Cb and Cr), wherein a relatively low (e.g. zero) degree of compression is performed in areas of an original color image having relatively higher importance, a relatively higher degree of compression in those areas indicated to be of lower importance. It performs a hierarchical encoding of a reduced wavelet image by discarding wavelet coefficients which satisfy the two criteria of firstly corresponding to image areas of relatively lower importance and secondly being below a certain wavelet coefficient threshold. The wavelet coefficient threshold is determined from a calculation histogram to remove a percentage of the image and can be specified as an input parameter by a user.

31 Claims, 2 Drawing Sheets

U.S. PATENT DOCUMENTS

| | | | |
|---|---|---|---|
| 5,321,776 A * | 6/1994 | Shapiro | 382/240 |
| 5,347,479 A * | 9/1994 | Miyazaki | 375/E7.04 |
| 5,477,272 A * | 12/1995 | Zhang et al. | 375/240.06 |
| 5,495,292 A * | 2/1996 | Zhang et al. | 375/240.02 |
| 5,602,589 A * | 2/1997 | Vishwanath et al. | 375/240.11 |
| 5,619,998 A | 4/1997 | Abdel-Malek et al. | |
| 5,764,807 A * | 6/1998 | Pearlman et al. | 382/240 |
| 5,802,369 A * | 9/1998 | Ganesh et al. | 382/232 |
| 6,314,452 B1 | 11/2001 | Ovsiankin et al. | |
| 6,359,928 B1 * | 3/2002 | Wang et al. | 375/240.05 |
| 7,076,108 B2 * | 7/2006 | Huang et al. | 382/240 |
| 2001/0024529 A1 | 9/2001 | Chao et al. | |
| 2002/0006229 A1 * | 1/2002 | Chao et al. | 382/240 |
| 2003/0016855 A1 * | 1/2003 | Shinbata | 382/132 |

FOREIGN PATENT DOCUMENTS

| | | |
|---|---|---|
| WO | WO 97/16021 | 5/1997 |
| WO | WO 98/11728 | 3/1998 |
| WO | WO 98/40842 | 9/1998 |
| WO | WO 03/090471 | * 10/2003 |

OTHER PUBLICATIONS

Rege, P.P.; Jog, K.S., "A new statistical bit allocation system for subband coding of images," TENCON 99. Proceedings of the IEEE Region 10 Conference, vol. 1, no., pp. 666-669 vol. 1, 1999.*

Ducksbury, "Feature Detection and Fusion for Intelligent Compression", SPIE AeroSense 2001, Orlando,, Apr. 16-20, 2001.

Ducksbury et al. "Feature Detection and Fusion for Intelligent Compression", DERA/IEE workshop on intelligent sensor processing, Brimingham, Feb. 14, 2001.

Varga et al. "The Application of Intelligent Compression to Telepathology", National Corrections Telemedicine Conf., Tuscon, AZ Nov. 18-21, 2000.

Ducksbury, "Target Detection and Intelligent Image Compression", SPIE Aerosense 2000, Orlando Apr. 24-28, 2000.

* cited by examiner

DATA COMPRESSION FOR COLOUR IMAGES USING WAVELET TRANSFORM

This invention relates to a method, a computer program and an apparatus for data compression for colour images.

A colour image may contain a very large amount of data which makes it difficult to transmit over a conventional digital communications link because of bandwidth limitations. One specific problem arises in connection with histopathological slides used in medical treatment: these slides are chemically treated to introduce colour into tissue for diagnostic purposes. On such a slide, a tissue sample may be 1 cm$^2$, and camera images may be produced at a magnification of ×40; a 5 Mbyte image may occupy 0.339×0.25 mm: to digitise the entire tissue sample would require (10×10×5)/(0.339×0.25) Mbytes, i.e. 5899 Mbytes. To transmit this over a 56 Kbit/second (7 Kbyte/second) telephone line would take approximately 239 hours, nearly ten days, and it is emphasised this is merely for a single tissue sample. The problem rapidly worsens if large numbers of samples are required.

With increasing use of higher resolution cameras, image sizes and the requirement to transmit large images are increasing. There is also a requirement to preserve image quality as much as possible. When communications bandwidth is a significant limitation, images must be compressed prior to transmission and subsequently decompressed on receipt.

Known forms of compression can be divided into two categories, lossy and lossless. Lossy compression techniques can achieve very high rates of compression (e.g. 50:1, 100:1 or greater), but this is at the expense of loss of image information and image degradation. Lossless compression preserves image information and avoids degradation, but can only achieve a low degree of compression (e.g. 3:1).

Methods of compression of monochrome images have been published as follows:

Ducksbury, P. G., 'Feature detection and fusion for intelligent compression', SPIE Aerosense 2001, Orlando, 16-20 Apr. 2001.

Ducksbury P. G., 'Feature detection and fusion for intelligent compression', DERA/IEE workshop on intelligent sensor processing, Birmingham, 14 Feb. 2001.

Varga M. J. Ducksbury P. G., Leong F. J., McGee J. M., 'Application of intelligent compression to telepathology', National Corrections Telemedicine Conf., Tucson, Ariz., 18-21 Nov. 2000.

Ducksbury P. G., 'Target detection and intelligent image compression', SPIE Aerosense 2000, Orlando, 24-28 Apr. 2000.

However, none of the above references discloses compression of colour images.

Compression of colour images is disclosed in published U.S. patent application Ser. No. 2001/0024529 A1. It discloses use of a wavelet transformation to transform the image, thresholding wavelet coefficients, discarding sub-threshold wavelet coefficients and quantizing the remainder. This is a viable technique, but it is limited by the fact that all image data are compressed in the same way: therefore, at a sufficiently high degree of compression, image data which it is required to retain become compromised by compression on the same basis as unwanted image data.

Published U.S. patent application Ser. No. 2001/0024529 A1 also discloses compression of colour images by colour space transformation followed by wavelet transformation, quantisation and entropy reduction. Here again, like published US Pat. Appln. No. 2001/0024529 A1, all image data are compressed in the same way: compression therefore compromises required image data in the same way as unwanted image data.

The present invention provides a method of data compression for colour images characterised in that it includes the following steps:

a) establishing a value for a number of scales into which a wavelet transformation is to be made;

b) distinguishing areas in an original colour image of relatively higher importance from those of relatively lower importance;

c) transforming the colour image into a second image in a different colour system having relatively more image information in a first component and relatively less in other components;

d) sub-sampling the other components to reduce their respective numbers of pixels;

e) transforming the first component and the sub-sampled components into wavelet coefficients with the said number of scales;

f) transforming the importance-distinguished areas to correspond to location and number of scales of the wavelet transformation; and g) establishing a wavelet coefficient threshold and forming a reduced wavelet image by discarding wavelet coefficients which both correspond to image areas of relatively lower importance and are below the said threshold.

The invention provides the advantage that the reduced wavelet image is suitable for encoding, transmission over a digital communications link and production of a reconstituted colour image. Moreover, the invention implements a relatively low (e.g. zero) degree of compression in areas of an original colour image indicated to be of relatively higher importance, and a relatively high degree of compression in those indicated to be of relatively lower importance. In consequence the invention makes it possible to obtain a higher degree of compression in the overall image compared to lossless compression while preserving sufficient information in important image areas.

The invention may include the step of producing a reconstituted colour image by hierarchically encoding the reduced wavelet image to form an encoded image, transmitting the encoded image to another location, and implementing respective inverses of the steps of encoding, wavelet transformation, sub-sampling and colour image transformation. This step may comprise forming a progressive bitstream in which more important image features are encoded earlier, and which includes information on number image rows and columns, number of scales and filter type.

The step of distinguishing areas of relatively higher importance from those of relatively lower importance may comprise specifying a plurality of different levels of relatively lower importance, and the step of establishing a wavelet coefficient threshold and forming a reduced wavelet image then includes discarding progressively more wavelet coefficients as area importance level diminishes.

Relative importance of areas in an original colour image may be distinguished by associating differing binary digits therewith. The colour image may be transformed into a second image by a transformation into luminance, blue chrominance and red chrominance. Sub-sampling may reduce pixel number to one quarter that preceding, and wavelet transformation may employ a Daubechies-4 filter. The number of scales may be three, and a wavelet coefficient threshold may be established by forming a cumulative histogram of numbers of pixels not exceeding respective wavelet coefficient values.

In another aspect, the invention provides a computer program for use in data compression of colour images characterised in that it has instructions for implementing the following steps:

a) receiving a value for a number of scales into which a wavelet transformation is to be made;
   b) receiving an indication of areas in an original colour image having relatively higher importance and those of relatively lower importance;
   c) transforming the colour image into a second image in a different colour system having relatively more image information in a first component and relatively less in other components;
   d) sub-sampling the other components to reduce their respective numbers of pixels;
   e) transforming the first component and the sub-sampled components into wavelet coefficients with the said number of scales;
   f) transforming the importance-distinguished areas to correspond to location and number of scales of the wavelet transformation; and
   g) establishing a wavelet coefficient threshold and forming a reduced wavelet image by discarding wavelet coefficients which both correspond to image areas of relatively lower importance and are below the said threshold.

The computer program may have instructions for producing a reconstituted colour image by hierarchically encoding the reduced wavelet image to form an encoded image, transmitting the encoded image to another location, and implementing respective inverses of the steps of encoding, wavelet transformation, sub-sampling and colour image transformation. It may have instructions for producing an encoded image by forming a progressive bitstream in which more important image features are encoded earlier, and which includes information on number image rows and columns, number of scales and filter type. It may distinguish relative importance of areas in an original colour image by associating differing binary digits therewith.

The computer program may have instructions for distinguishing areas of relatively higher importance from those of relatively lower importance by specifying a plurality of different levels of relatively lower importance, and establishing a wavelet coefficient threshold and forming a reduced wavelet image by discarding progressively more wavelet coefficients as area importance level diminishes.

The computer program may have instructions for transforming the colour image into a second image by implementing a transformation into luminance, blue chrominance and red chrominance. Sub-sampling may reduce pixel number to one quarter that preceding. Wavelet transformation may employ a Daubechies-4 filter. The number of scales may be three. The wavelet coefficient threshold may be established by forming a cumulative histogram of numbers of pixels not exceeding respective wavelet coefficient values.

In a further aspect, the invention provides computer apparatus for use in data compression of colour images, the apparatus being arranged to run the computer program of the invention.

In order that the invention might be more fully understood, an embodiment thereof will now be described, by way of example only, with reference to the accompany drawings, in which.

Figure 1:
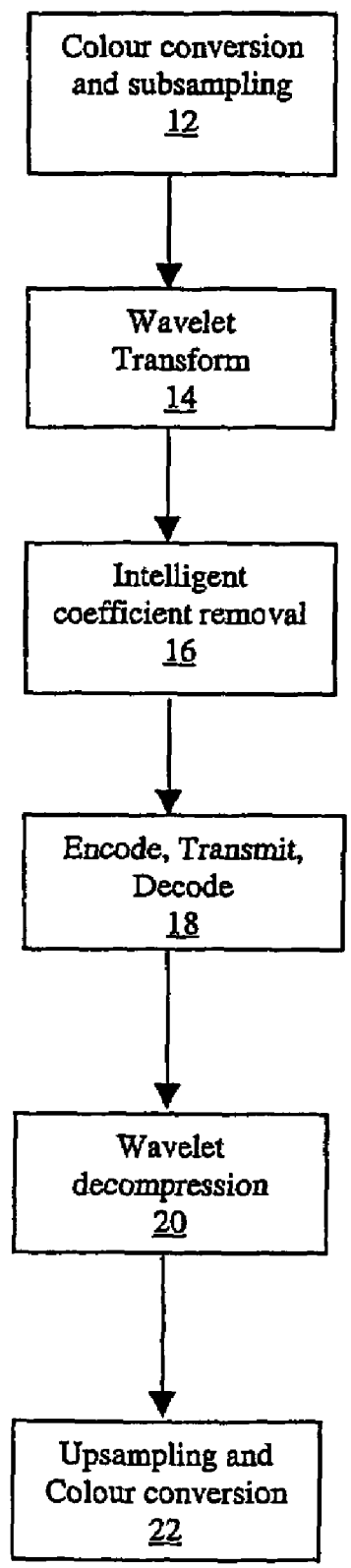
FIG. 1 is a flow diagram of a data compression technique of the invention.

The method of the invention will first be described in outline and later in more detail. Referring to FIG. 1, the method of the invention is indicated generally by 10. At 12, an input image to be data compressed is converted from red, green and blue (RGB) image planes or colours to a YCbCr colour scheme, i.e. new image planes are derived for luminance Y, blue chrominance Cb and red chrominance Cr respectively: this has the effect that the Y image plane contains more image information than each of the Cb and Cr image planes, which are then reduced in size by discarding pixels (sub-sampling). Other colour transformations into components with unequally distributed image information may also be used.

Next, at 14, the Y, Cb and Cr image planes are subjected to a wavelet compression scheme. At 16 unimportant wavelet coefficients are discarded. The Y, Cb and Cr image planes are then in a suitably compressed form for encoding and transmission over a digital communications link in a much shorter time interval than would be required for the original red, green and blue image planes. The compressed image planes are encoded, transmitted, received and decoded at 18. Encoding and decoding are carried out in accordance with U.S. Pat. No. 5,764,807 to Pearlman et al. The compressed image planes are then subjected to inverse wavelet transform at 20. At 22 the Cb and Cr image planes are increased in size by upsampling, and then the resulting image planes and the Y image plane are reverse colour converted to produce an RGB image.

The method of the invention will now be described in more detail. It initially employs two input images: one such is a colour image in conventional RGB format, i.e. it has intensity values for the colours red, green and blue at each pixel in the image. The other input image is binary (each pixel value is 0 or 1) and referred to as a "mask": it may be produced manually by an observer or by a scanning device: e.g. an observer might view the colour image on a computer monitor and use a mouse to draw boundaries around areas of interest. Pixels within each boundary would be assigned a binary 1 value and other pixels binary 0: the value 1 represents a pixel which is potentially of interest and 0 a pixel regarded as unworthy of further consideration. The input binary image mask acts as an object mask for use in accepting some and rejecting other RGB image regions in subsequent image processing: the mask indicates which parts of the colour image are of more importance than others. A human operator is also required to specify a required percentage removal of wavelet coefficients (to be defined later) and the required size to which the image is to be compressed expressed as a storage file size.

The original RGB video colour image referred to above is converted to a YCbCr colour space as described by K. Jack in 'Video Demystified—a handbook for the digital engineer', Hightext Publications, San Diego, 1996. This is carried out in step 12 for each pixel in the RGB image using Equations (1) to (3) below.

$$Y = 0.257*red + 0.504*green + 0.098*blue + 16 \tag{1}$$

$$Cb = -0.148*red - 0.291*green + 0.439*blue + 128 \tag{2}$$

$$Cr = 0.439*red - 0.368*green - 0.071*blue + 128 \tag{3}$$

where "red", "green" and "blue" represent respectively red, green and blue pixel intensities. This produces Y, Cb and Cr values for each pixel in the original RGB image, and consequently it generates a Y image plane, a Cb image plane and a Cr image plane. The effect of the transformation implemented by Equations (1) to (3) is that relatively more image information appears in the Y image and relatively less in the Cb and Cr images compared to the original RGB image.

Also in step 12, the Cb and Cr images are then "subsampled" to reduce them by a factor of 2 in both width and height dimensions: sub-sampling involves dividing each of these two entire images into 2×2 groups of four pixels, and replacing each group by a single pixel having the value of the respective group's top-left hand pixel. Any one of the other three pixels in each group could be used instead, so long as pixels selected in all groups are like located. The image resulting from sub-sampling is a quarter of the size of the original in each case. The output of step 12 are three image planes Y, Cb and Cr, the first of which is full size and the second and third of which are one quarter size.

Figure 2:
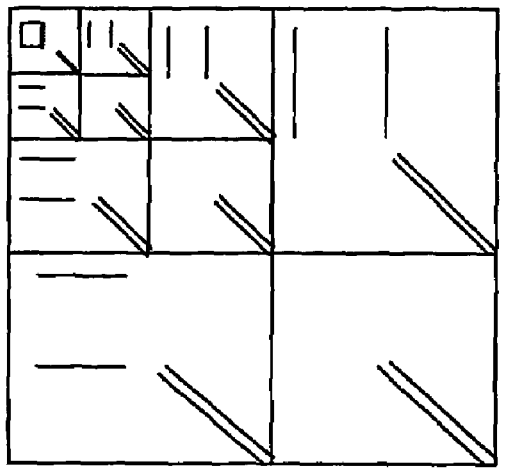
FIG. 2 is drawing of a wavelet decomposition of a test image.
Figure 3:
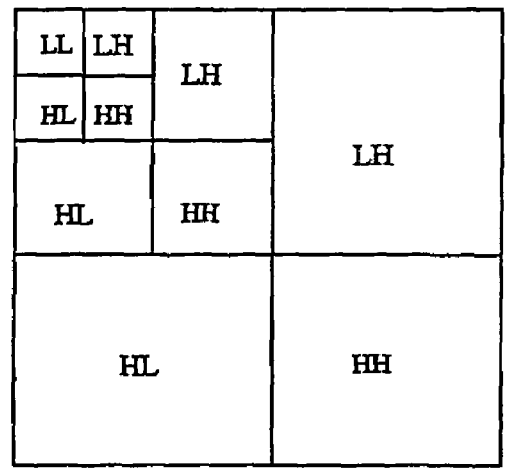
FIG. 3 is a drawing indicating components in FIG. 2.

Referring now also to FIGS. 2 and 3, there is shown a line drawing representation of an example of a wavelet transformation 30 for a test image (not shown): the test image has the same size as the transformation 30, and it is a white square and a diagonal line on a gray background. The wavelet transformation 30 has three scales indicated by the number of times squares with like contents appear at different magnifications. In FIG. 2, a smallest sized square 32 consists of the original test image in a form fully reduced by the decomposition process, and showing the background 34, square 36 and diagonal line 38. Transforming an image into a wavelet domain in step 14 using a wavelet filter makes it more amenable to data compression. In this example (as will be described later in more detail) a wavelet filter is applied to extract image boundary information from each of the three image planes Y, Cb and Cr in terms of their respective horizontal, vertical and diagonal components and at a number of different scales or magnifications.

FIG. 3 illustrates the overall structure of a wavelet decomposition in terms of its components: HH represents high horizontal and high vertical (i.e. diagonal), LH represents low horizontal and high vertical, HL represents high horizontal and low vertical whilst LL is low horizontal and low vertical (i.e. the original small sub-sampled gray level version). The wavelet filter process is described by 1. Daubechies in 'Wavelets', SIAM (Society for Industrial and Applied Mathematics), Philadelphia, 1992: it is applied to each of the three colour transformed image planes (Y, Cb, Cr) individually. The wavelet filter used in this example is a Daubechies filter having four coefficients, i.e.: 0.482962913144534, 0.836516303737807, 0.224143868042013 and −0.1294095225512604, and is referred to as Daubechies-4 filter: it is the simplest or lowest order of the Daubechies filters. It is possible to use other filters, but some filters produce effects like ringing (ghosting) around objects whilst others may produce 'staircasing' effects (steps appearing on diagonal lines). The process of wavelet filtering involves applying two related convolutions to transform image plane pixel data, one convolution to odd numbered image pixel rows and columns and the other to even numbered equivalents: i.e. both rows and columns are convolved. Designating the Daubechies-4 filter coefficients as $c_0$, $c_1$, $c_2$ and $c_3$, and defining a vector a having coefficients $a_j$, $a_{j+1}$, $a_{j+2}$ and $a_{j+3}$ as a jth data set of four adjacent pixel values (in a row or column) for convolution into $K_j$, then the two convolutions are given by:

Odd rows or columns: $K_j = c_3 a_j - c_2 a_{j+1} + c_1 a_{j+2} - c_0 a_{j+3}$ (4)

Even rows or columns: $K_j = c_0 a_j + c_1 a_{j+1} + c_2 a_{j+2} + c_3 a_{j+3}$ (5)

Equations (4) and (5) express the wavelet filtering operation as taking successive sets of four adjacent pixels (i.e. j=1, pixels $a_1$ to $a_4$, j=2, pixels $a_2$ to $a_5$ etc., where j to j+3 are row or column numbers of pixels in the set, and the convolution is a column or row convolution respectively). The filter coefficients $c_3$ to $-c_0$ in Equation (4) can be considered as providing a 'not a smoothing filter' whilst the filter coefficients $c_0$ to $c_3$ in Equation (5) can be considered as providing a 'smoothing filter'. Convolution using Equation (4) provides for odd rows or columns to yield a zero or insignificant response to a data vector that is considered to be smooth, and to yield 'detail' in a data vector that isn't smooth.

The convolutions expressed by Equations (4) and (5) are applied in a respective iterative process to each of the three image planes Y, Cb and Cr obtained earlier, Y being full size and Cb and Cr one quarter size. This yields three wavelet representations. In order to implement Equations (4) and (5), a mathematical function referred to as "numerical recipes function pwt" is applied to the image planes Y, Cb and Cr. The numerical recipes function pwt is disclosed in 'Numerical Recipes in C', $2^{nd}$ Ed., Cambridge University Press, 1992. In order to use this function each row of pixel values in a Y, Cb or Cr image plane is treated as a one dimensional (1D) vector: the function is used to transform the vector taking four consecutive of pixels values at a time and incrementing j in Equations (4) and (5) to move along the vector. Towards the end of each 1D vector, when there are less than four pixel values remaining in the vector, wrap-around is used (i.e. additional pixel values are taken from the beginning of the vector to make up the four required). The values $K_j$ that are computed in this way become coefficients of a new 1D vector: the coefficients are arranged so that this new vector has a first half representing 'smooth' information (from Equation (5)), and a second half representing 'detail' information (from Equation (4)). When all rows have been processed with the numerical recipes function pwt to provide a transformed image, columns in the transformed image are processed in the same way: i.e. each 1D vector is now a respective transformed image column.

The procedure also requires the number of scales or magnifications employed in the process to be predefined by a user. In the example described with reference to FIGS. 2 and 3 the number of scales is three. The only restriction on the number of scales used is computational burden, and a number of scales in the ranges 3 to 6 is acceptable. The above wavelet transformation process implementing Equations (4) and (5) is carried out for each of the three colour converted image planes (Y, Cb and Cr) obtained in step 12 (each referred to below as "the image plane"). This process may be expressed as a computer program as follows:

Set a variable minsizex equal to the number of rows in the image plane divided by 2 to the power of the number of scales, e.g.

$$\frac{\text{number of rows}}{2^{scales}};$$

Set a variable minsizey equal to the number of columns in the image plane divided by 2 to the power of the number of scales, e.g.

$$\frac{\text{number of columns}}{2^{scales}};$$

Set x equal to the number of rows in the image plane;
Set y equal to the number of columns in the image plane;
Loop as long as (x>minsizex) and (y>minsizey):
    Loop over the number of rows in the image plane:
        Copy row i to form a temporary 1D vector;
        Call numerical recipes function pwt for a forward transform with Daubechies-4 filter coefficients and apply it to 1D vector
        Copy result as row i of a new wavelet image
    Loop over the number of columns in the new wavelet image
        Copy column i to form a temporary 1D vector
        Call numerical recipes function pwt for a forward transform with Daubechies-4 filter coefficients and apply it to 1D vector
        Copy result back into column i of the image
    Divide x by 2
    Divide y by 2

Here the expression "forward transform" means a transform from an image plane to wavelet coefficients. The effect of the above computer program is that successive rows are convolved using Equation (4) (odd rows) or (5) (even rows), and each resulting convolution of four pixel values yields a new pixel value for insertion in the new wavelet image. When all rows have been convolved to produce the new wavelet image, columns of this new wavelet image are subjected to the same procedure: this provides wavelet information at a largest scale. The row and column lengths x and y are then divided by two and the row and column convolution procedures are repeated to provide wavelet information at a next to largest scale. Division by two and row and column convolution is repeated until the prearranged number of scales has been processed, i.e. three in the above example, and indicated by x or y ceasing to be greater than minsizex or minsizey respectively.

This convolution process provides three new filtered images containing wavelet coefficients. It produces resulting images which have the structure shown in FIG. 2 where the horizontal, vertical and diagonal components of the images are decomposed and represented in specific parts of the three resulting wavelet images.

Figure 4:
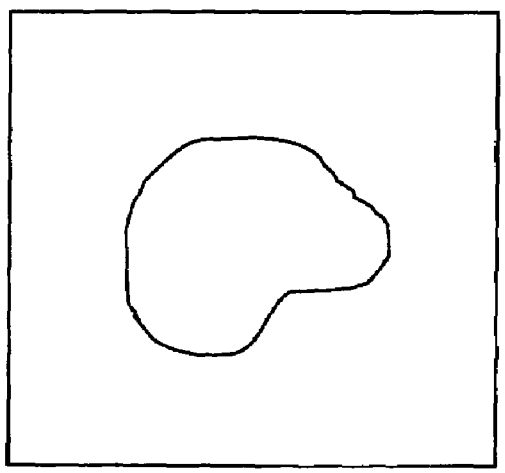
FIG. 4 is a drawing of a mask indicating significant image features.
Figure 5:
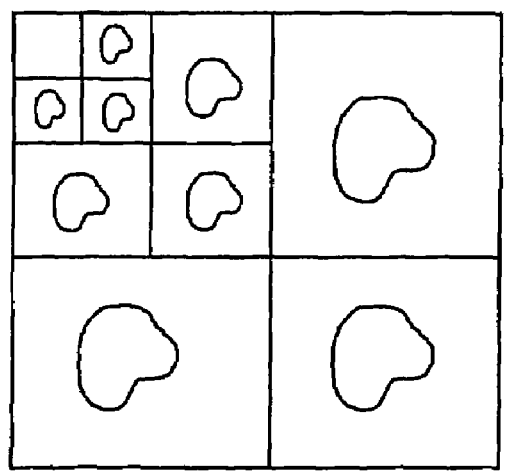
FIG. 5 is a decomposed version of the mask of FIG. 4.

The next stage 16 in the process of this example is "intelligent" coefficient removal: firstly, the input binary mask image (the second of the two original input images) is taken and it is decomposed so that it has the same structure as the wavelet images previously computed for the Y, Cb and Cr image planes. The purpose is to provide a wavelet mask image which distinguishes significant and insignificant features of the image plane wavelet images. FIG. 4 is an example of a simple input binary mask image and FIG. 5 is its wavelet transformation. The process is as follows expressed in computer program form.

Set the variable minsizex equal to the number of rows divided by 2 to the power of the number of scales (3 in this example), i.e.

$$minsizex = \frac{\text{number of rows}}{2^{scales}}$$

Set the variable minsizey equal to the number of columns divided by 2 to the power of the number of scales, i.e.

$$minsizey = \frac{\text{number of columns}}{2^{scales}}$$

Set a variable nx equal to the number of rows and a variable ny equal to the number of columns
Loop as long as (nx>minsizex and ny>minsizey)
    divide nx by 2
    divide ny by 2
    sub-sample the mask into a temporary array as follows
    loop for i=0 to nx
        loop for j=0 to ny
            temporary array[i][j]=mask[2*i][2*j]
    now copy this sub-sampled mask into each of four image quadrants,
    first the top left quadrant, as follows
    loop for i=0 to nx
        loop for j=0 to ny
            mask[i][j]=temporary array[i][j]
    second, copy the bottom left quadrant, as follows
    loop for i=nx to 2*nx
        loop for j=0 to ny
            mask[i][j]=temporary array[i−nx][j]
    third, copy the top right quadrant, as follows
    loop for i=0 to nx
        loop for j=ny to 2*ny
            mask[i][j]=temporary array[i][j−ny]
    finally, copy the bottom right quadrant, as follows
    loop for i=nx to 2*nx
        loop for j=ny to 2*ny
            mask[i][j]=temporary array [i−nx][j−ny]

The instruction "temporary array[i][j]=mask[2*i][2*j]" in the above computer program reduces the original binary input mask by a factor of two in both x and y dimensions, i.e. by a factor of four in area: it forms a sub-sampled mask or temporary array by replacing each square block of four contiguous pixels indicated by [2*i][2*j] in the original binary input mask by a single pixel indicated by [i][j] having the value of the top left hand pixel in the square block. The sub-sampled mask is then entered into the four quadrants of a new image by giving appropriate new pixel addresses to its pixels (e.g. by instructions such as mask[i][j]=temporary array[i−nx][j] which inverts pixel x co-ordinates); then the sub-sampled mask is sub-sampled once more and used to provide four 1/16 size images to overwrite the top left hand ¼ size image. For each execution of the loop the top-left quadrant becomes the next image to subsample and the process repeats. This procedure is carried out a number of times equal to the number of scales (three in the present example), so in this example the smallest sub-sampled mask is 1/64 of the area of the original. The output from this is now a transformed mask as shown in FIG. 5, which is in the correct format.

Wavelet coefficients to be removed are now derived for each of the wavelet coefficient images obtained for the colour converted image planes (Y, Cb and Cr) respectively. This is carried out as follows: minimum and maximum pixel values are found for the wavelet coefficient image and a histogram is obtained. The histogram (referred to below as the original histogram) shows the number of pixels having each possible magnitude value, and is a vector of such values. It is used to form a cumulative histogram as follows. A first entry (pixel magnitude value) in the original histogram is set equal to a first entry in the cumulative histogram: all other entries in the cumulative histogram are the sums of corresponding entries in the original histogram with those preceding respectively:

i.e. the ith entry $C_i$ in the cumulative histogram is the sum of entries $O_1$ to $O_i$ in the original histogram. This can be achieved by setting $C_i=C_{i-1}+O_i$, i.e. the cumulative histogram's ith entry is set equal to the sum of its preceding or (i-j)th entry and the ith entry in the original histogram. The cumulative histogram is then used in data compression to remove a percentage of the image data. The percentage is specified as an input parameter by a user or is otherwise predetermined—a typical value is in the range 75-95%. This can be written as a computer program as follows:

Cumulative histogram[0]=original histogram[0]
    Loop for i=1 to number of entries
        Cumulative histogram[entry i]=cumulative histogram [entry i-1]+original histogram[entry i]
    Locate the specified percentage point on the cumulative histogram and take the pixel value of the cumulative histogram at this point as a threshold for use below.
    Threshold the wavelet coefficient image such that every pixel satisfying the two following criteria is discarded (set to 0): firstly the respective corresponding pixel in the transformed binary mask (FIG. 5) is zero, and secondly the pixel magnitude is less than the threshold produced in the preceding step.

This procedure is carried out for all three filtered wavelet coefficient images obtained as previously described. It provides three reduced wavelet images each containing a reduced set of wavelet coefficients.

The next stage 18 of the invention involves encoding the three reduced wavelet images produced in step 16, transmitting them in this data compressed form to another location, and then decoding them. In the present example, an encoding process is used which is an application of that disclosed in U.S. Pat. No. 5,764,807 to Pearlman et. al. (although other encoding schemes may be used): in this process each reduced wavelet image is subjected to hierarchical encoding to transform it into a progressive bitstream: in this connection a progressive bitstream is one in which more important image features are encoded earlier. The bitstream also contains a header, which includes the number of rows, columns, scales and filter number (in this case Daubechies-4) for use in the decoding process. In addition to this a human operator specifies as a parameter the required output file size for the bitstream. Transmission of a progressive bitstream can be truncated prematurely while retaining the ability to reconstruct or decode an image from its truncated equivalent (albeit image quality worsening with progressively earlier termination). Encoding includes a sub-band decomposition of the reduced wavelet image to derive coefficients, followed by coding of the coefficients for transmission. During encoding, lists are used comprising a list of significant pixels (LSP), a list of insignificant pixels (LIP) and a list of insignificant sets of pixels (LIS). Pixels in the LIP are tested and significant ones are moved to the LSP. Similarly, pixel sets found to be significant are removed from the LIS and partitioned into subsets: subsets with more than one element are returned to the LIS, while single coordinate sets are added to the LIP if insignificant or to the LSP otherwise. Decoding is the inverse of encoding and will not be described further.

The decoding process provides three decoded bitstreams each corresponding to a respective reduced wavelet image. Wavelet decompression in step 20 is carried out by applying an inverse wavelet transform to each decoded bitstream as follows:

Set the variable minsizex equal to the number of rows divided by 2 to the power of the number of scales, e.g.

$$\frac{\text{number of rows}}{2^{scales}}$$

Set the variable minsizey equal to the number of columns divided by 2 to the power of the number of scales, e.g.

$$\frac{\text{number of columns}}{2^{scales}}$$

Set x equal to minsizex
    Set y equal to minsizey
    Loop as long as (x<number of image rows) and (y<number of image columns)
        Multiply both x and y by 2
        Loop over the image plane rows
            Copy row i into a temporary 1D vector
            Call numerical recipes [4] function pwt for an inverse transform with Daubechies-4 filter coefficients
            Copy result back into row i of the image
        Loop over the image plane columns
            Copy column i into a temporary 1D vector
            Call numerical recipes [4] function pwt for an inverse transform with Daubechies-4 filter coefficients
            Copy result back into column i of the image Here the expression "inverse transform" means a transform from wavelet coefficients to an image plane. The result of this process is a set of three decompressed image planes, i.e. Y, Cb and Cr image planes.

Upsampling and colour conversion is carried out in the next step 22, which is applied to the Y, Cb and Cr image planes from the preceding inverse wavelet transformation or decompression step 20. Firstly, the Cb and Cr image planes are upsampled (increased) by a factor of 2 in both width and height: this is done by replicating each image plane pixel into a 2×2 block of four pixels in the new image. This provides Cb and Cr image planes which are of the same dimensions as the Y image plane. An inverse colour conversion is then applied to convert YCbCr to RGB as disclosed by K Jack in 'Video Demystified—a handbook for the digital engineer', Hightext Publications, San Diego, 1996: it is as follows:

$$\text{Red}=1.164*(Y-16)+1.596*(Cr-128) \quad (6)$$

$$\text{Green}=1.164*(Y-16)-0.813*(Cr-128)-0.392*(Cb-128) \quad (7)$$

$$\text{Blue}=1.164*(Y-16)-2.017*(Cb-128) \quad (8)$$

This provides three RGB colour planes, which form the image for display on a colour monitor for example.

It has been shown that the invention can achieve 100:1 compression of colour images in the form of histopathological slides while preserving diagnostic information. This compares very favourable with about 3:1 for prior art lossless compression and about 50:1 for prior art lossy compression.

In the compression process of the invention, a user may initially prioritise regions of interest in accordance with their relative importance: a sliding scale (referred to as a 'traffic light') may be used from high importance through to low importance. The compression process is then adapted to discard an increasing percentage of wavelet coefficients as the importance of the regions of interest diminishes. In one example, 75% removal of background information is required and there are three regions of interest denoted by r1, r2 and r3: here r1 is most important, r2 is of lesser importance and r2 is of least importance. Wavelet coefficients derived from r1 are retained in full, r2 has 25% removal of wavelet coefficients and r3 has 50% removal. This compares with 75% removal of background wavelet coefficients. The removal of wavelet coefficients from prioritised regions of interest is arranged so that the least important region r3 has less removal than the background compared to which it is more important. In an earlier example of the invention, there were only two levels of importance, relatively high and relatively low (background). This later approach of more than two levels of importance corresponds to sub-dividing the former relatively low importance level into a plurality of importance levels with differing degrees of wavelet removal. A reduced wavelet image is then formed by discarding progressively more wavelet coefficients as area importance level diminishes.

Since inter alia examples of computer program code for implementing the invention have been given, the invention can clearly be implemented using an appropriate computer program comprising program instructions recorded on an appropriate carrier medium and running on a conventional computer system. The carrier medium may be a memory, a floppy or compact or optical disc or other hardware recordal medium, or an electrical signal. Such a program is straightforward for a skilled programmer to implement from the foregoing description without requiring invention, because it involves well known computational procedures.

The invention claimed is:

1. A method of data compression for colour images wherein it incorporates the following steps:
   using a computer to perform the steps of:
   a) establishing a value for a number of scales into which a wavelet transformation is to be made;
   b) distinguishing areas in an original colour image of relatively higher importance from those of relatively lower importance;
   c) transforming the colour image into a second image in a different colour system having relatively more image information in a first component and relatively less in other components;
   d) sub-sampling the other components to reduce their respective numbers of pixels;
   e) transforming the first component and the sub-sampled components into wavelet coefficients with the said number of scales;
   f) transforming the importance-distinguished areas to correspond to location and number of scales of the wavelet transformation; and
   g) establishing a wavelet coefficient threshold and forming a reduced wavelet image by discarding wavelet coefficients which both correspond to image areas of relatively lower importance and are below the said threshold.

2. A method according to claim 1 including the step of producing a reconstituted colour image, this step comprising forming an encoded image by hierarchically encoding the reduced wavelet image, transmitting the encoded image to another location, and implementing respective inverses of the steps of encoding, wavelet transformation, sub-sampling and colour image transformation.

3. A method according to claim 2 wherein the step of forming an encoded image comprises forming a progressive bitstream in which more important image features are encoded earlier, and which includes information on number image rows and columns, number of scales and filter type.

4. A method according to claim 1 wherein the step of distinguishing areas in an original colour image of relatively higher importance from those of relatively lower importance comprises associating differing binary digits therewith.

5. A method according to claim 1 wherein:
   a) the step of distinguishing areas of relatively higher importance from those of relatively lower importance comprises specifying a plurality of different levels of relatively lower importance, and
   b) the step of establishing a wavelet coefficient threshold and forming a reduced wavelet image includes discarding progressively more wavelet coefficients as area importance level diminishes.

6. A method according to claim 1 wherein the step of transforming the colour image into a second image comprises transformation into luminance, blue chrominance and red chrominance.

7. A method according to claim 1 wherein the step of sub-sampling reduces pixel number to one quarter that preceding.

8. A method according to claim 1 wherein the step of wavelet transformation employs a Daubechies-4 filter.

9. A method according to claim 1 wherein the number of scales is in the range three to six.

10. A method according to claim 1 wherein the step of establishing a wavelet coefficient threshold comprises forming a cumulative histogram of numbers of pixels not exceeding respective wavelet coefficient values.

11. A computer readable medium including a computer program for use in data compression of colour images and having instructions for controlling computer apparatus to implement the following steps:
    a) receiving a value for a number of scales into which a wavelet transformation is to be made;
    b) receiving an indication of areas in an original colour image having relatively higher importance and those of relatively lower importance;
    c) transforming the colour image into a second image in a different colour system having relatively more image information in a first component and relatively less in other components;
    d) sub-sampling the other components to reduce their respective numbers of pixels;
    e) transforming the first component and the sub-sampled components into wavelet coefficients with the said number of scales;
    f) transforming the importance-distinguished areas to correspond to location and number of scales of the wavelet transformation; and
    g) establishing a wavelet coefficient threshold and forming a reduced wavelet image by discarding wavelet coefficients which both correspond to image areas of relatively lower importance and are below the said threshold;
    wherein the computer readable medium is a computer readable storage medium.

12. A computer readable medium including a computer program according to claim 11 having instructions for controlling computer apparatus to implement production of a reconstituted colour image by forming an encoded image by hierarchically encoding the reduced wavelet image, transmitting the encoded image to another location, and implementing respective inverses of the steps of encoding, wavelet transformation, sub-sampling and colour image transformation.

13. A computer readable medium including a computer program according to claim 11 having instructions for controlling computer apparatus to implement formation of an encoded image by forming a progressive bitstream in which more important image features are encoded earlier, and which includes information on number image rows and columns, number of scales and filter type.

14. A computer readable medium including a computer program according to claim 11 having instructions for controlling computer apparatus to distinguish areas in an original colour image of relatively higher importance from those of relatively lower importance by associating differing binary digits therewith.

15. A computer readable medium including a computer program according to claim 11 having instructions for controlling computer apparatus to implement transformation of the colour image into a second image by implementing a transformation into luminance, blue chrominance and red chrominance.

16. A computer readable medium including a computer program according to claim 11 having instructions for controlling computer apparatus to:
  a) distinguish areas of relatively higher importance from those of relatively lower importance by specifying a plurality of different levels of relatively lower importance, and
  b) establish a wavelet coefficient threshold and forming a reduced wavelet image by discarding progressively more wavelet coefficients as area importance level diminishes.

17. A computer readable medium including a computer program according to claim 11 having instructions for controlling computer apparatus to sub-sample by reducing pixel number to one quarter that preceding.

18. A computer readable medium including a computer program according to claim 11 having instructions for controlling computer apparatus to implement wavelet transformation with a Daubechies-4 filter.

19. A computer readable medium including a computer program according to claim 11 wherein the number of scales is in the range three to six.

20. A computer readable medium including a computer program according to claim 11 having instructions for controlling computer apparatus to establish a wavelet coefficient threshold by forming a cumulative histogram of numbers of pixels not exceeding respective wavelet coefficient values.

21. An apparatus for use in data compression of colour images comprising:
  computer that is programmed to implement the following steps:
    a) receiving a value for a number of scales into which a wavelet transformation is to be made;
    b) receiving an indication of areas in the original colour image having relatively higher importance and those of relatively lower importance;
    c) transforming the original colour image into a second image in a different colour system having relatively more image information in a first component and relatively less in other components;
    d) sub-sampling the other components to reduce their respective numbers of pixels;
    e) transforming the first component and the sub-sampled components into wavelet coefficients with the said number of scales;
    f) transforming the importance-distinguished areas to correspond to location and number of scales of the wavelet transformation; and
    g) establishing a wavelet coefficient threshold and forming a reduced wavelet image by discarding wavelet coefficients which both correspond to image areas of relatively lower importance and are below the said threshold.

22. The apparatus according to claim 21 wherein the computer is programmed to implement production of a reconstituted colour image by forming an encoded image by hierarchically encoding the reduced wavelet image, transmitting the encoded image to another location, and implementing respective inverses of the steps of encoding, wavelet transformation, sub-sampling and colour image transformation.

23. The apparatus according to claim 21 wherein the computer is programmed to form an encoded image by forming a progressive bitstream in which more important image features are encoded earlier, and which includes information on number image rows and columns, number of scales and filter type.

24. The apparatus according to claim 21 wherein the computer is programmed to distinguish areas in an original colour image of relatively higher importance from those of relatively lower importance by associating differing binary digits therewith.

25. The apparatus according to claim 21 wherein the computer is programmed to transform the colour image into a second image by implementing a transformation into luminance, blue chrominance and red chrominance.

26. The apparatus according to claim 21 wherein the computer is programmed to:
  a) distinguish areas of relatively higher importance from those of relatively lower importance by specifying a plurality of different levels of relatively lower importance, and
  b) establish a wavelet coefficient threshold and forming a reduced wavelet image by discarding progressively more wavelet coefficients as area importance level diminishes.

27. The apparatus according to claim 21 wherein the computer is programmed to sub-sample by reducing pixel number to one quarter that preceding.

28. The apparatus according to claim 21 wherein the computer is programmed to implement wavelet transformation with a Daubechies-4 filter.

29. The apparatus according to claim 21 wherein the computer is wherein the number of scales is in the range three to six.

30. The apparatus according to claim 21 wherein the computer is programmed to establish a wavelet coefficient threshold by forming a cumulative histogram of numbers of pixels not exceeding respective wavelet coefficient values.

31. A method of data compression for colour images wherein it incorporates the following steps:
  using a computer to perform the steps of:
    a) establishing a value for a number of scales into which a wavelet transformation is to be made;
    b) distinguishing areas in an original colour image of relatively higher importance from those of relatively lower importance, and specifying a plurality of different levels of relatively lower importance;
    c) transforming the colour image into a second image in a different colour system having relatively more image information in a first component and relatively less in other components;
    d) sub-sampling the other components to reduce their respective numbers of pixels;
    e) transforming the first component and the sub-sampled components into wavelet coefficients with the said number of scales;
    f) transforming the importance-distinguished areas to correspond to location and number of scales of the wavelet transformation; and g) establishing a wavelet coefficient threshold and forming a reduced wavelet image by discarding wavelet coefficients which both correspond to image areas of relatively lower importance and are below the said threshold, and discarding progressively more wavelet coefficients as area importance level diminishes.

* * * * *

UNITED STATES PATENT AND TRADEMARK OFFICE
CERTIFICATE OF CORRECTION

PATENT NO. : 7,512,277 B2  Page 1 of 1
APPLICATION NO. : 10/510649
DATED : March 31, 2009
INVENTOR(S) : Ducksbury et al.

It is certified that error appears in the above-identified patent and that said Letters Patent is hereby corrected as shown below:

Title page, item (73) Assignee, delete "Qinetio Limited (GB)" and replace with

-- QinetiQ Limited (GB) --.

Signed and Sealed this

Second Day of June, 2009

JOHN DOLL
*Acting Director of the United States Patent and Trademark Office*